Feb. 5, 1957 C. WINTGENS 2,780,035
APPARATUS FOR SURFACING ARTICLES
Filed April 9, 1954
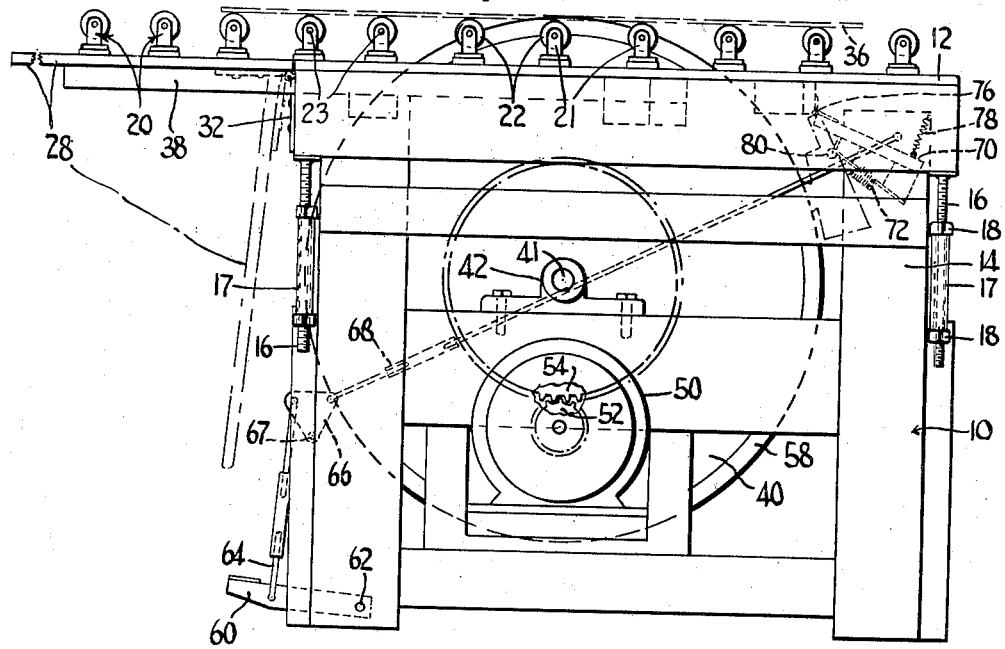
FIG. 1
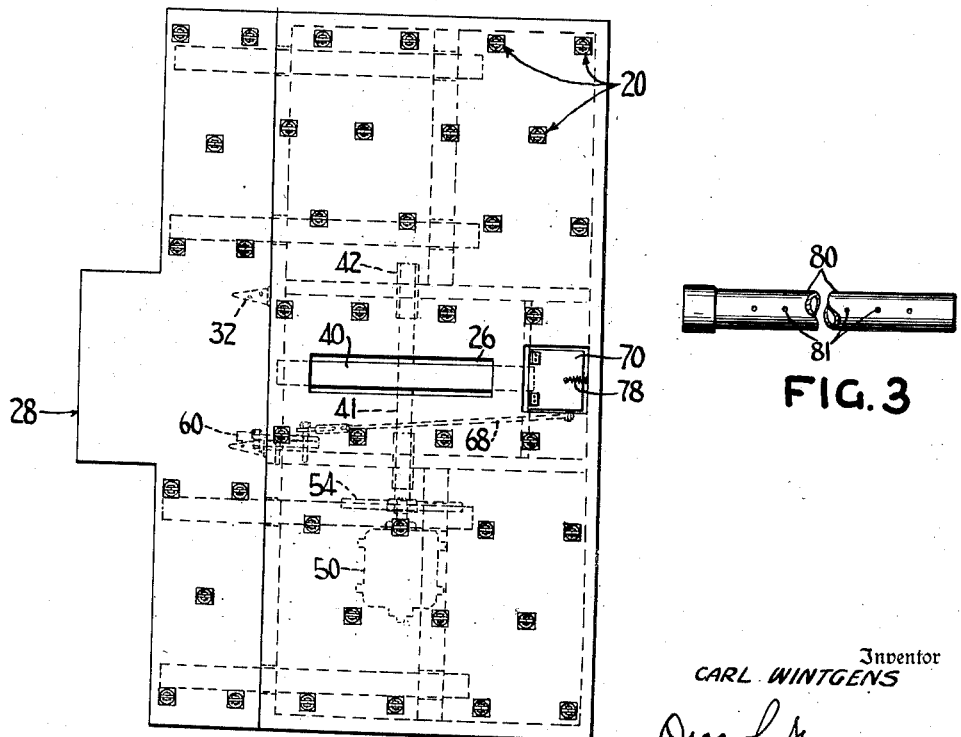
FIG. 2
FIG. 3
Inventor
CARL WINTGENS
Oscar L. Spencer
Attorney

United States Patent Office 2,780,035
Patented Feb. 5, 1957

2,780,035
APPARATUS FOR SURFACING ARTICLES

Carl Wintgens, Tarentum, Pa., assignor to Pittsburgh Plate Glass Company, Allegheny County, Pa., a corporation of Pennsylvania Application April 9, 1954, Serial No. 422,136

5 Claims. (Cl. 51—72)

This invention relates to an apparatus for polishing, buffing or abrading surfaces of material and it has particular relationship to an apparatus suitable for surfacing large, heavy materials such as large sheets of plate glass.

In the manufacture of plate glass there are frequently scratches or defective areas on the surface of the glass which are of such nature that they are insufficient to cause rejection of the sheet of glass but nevertheless are objectionable from an optical standpoint. These areas are subjected to buffing wheels known as "scratch wheels" to smooth out the defects and render the glass commercially acceptable. When large sheets of plate glass are to be locally buffed by such wheels, two or more men are required to hold the glass adjacent the buffing surface and otherwise manipulate the glass.

In accordance with the present invention an apparatus for surfacing these large sheets of glass has been provided which enables one man to handle and surface the glass easily. This apparatus comprises a suitable surfacing wheel or buffing wheel disposed in combination with a table having castors mounted on the surface of the table for supporting the glass. The apparatus also embodies a simple mechanism for replenishing a surfacing or buffing solution on the surfacing wheel by the operator while he is surfacing the sheet of glass.

The invention is further described in conjunction with the drawings in which;

Fig. 1 is a side view of the apparatus of the present invention;

Fig. 2 is a plan view of the apparatus illustrated in Fig. 1; and

Fig. 3 is an elevation of a surfacing solution container.

In the drawing, a table 10 is shown having a table top 12 mounted on vertically adjustable legs 14. The legs are adjustable by means of adjustment bolts 16 which are rigidly secured to the table top and extend loosely into sleeves 17 which form a part of the table legs. Nuts 18 screw threaded on the bolt at the top and bottom of each sleeve provide for vertical adjustment of the bolt 16 and table top 12.

At various positions on top of the table are mounted a series of freely rotatable inverted castors 20. Each castor 20 includes a castor bracket 21, which is free to rotate around a vertical axis and a castor wheel 22 free to rotate around a horizontal axis provided by a horizontally extending axle 23 carried by the bracket. An opening 26 is formed in the central portion of the table top 12.

A portion 28 of the table top 12 is connected to the table top by means of hinges 32. This portion 28 remains horizontal in line with the surface of the table top when a sheet of glass 36 is being placed on the surfacing apparatus. It is supported in such position by means of slidable supports 38. After the glass has been placed on the table, the supports 38 are pushed in underneath the table and portion 28 is lowered to a substantially vertical position. In such position, it performs a further function as a shield preventing the buffing solution from splashing on the operator.

A surfacing wheel 40 is supported on shaft 41 rotatably mounted in bearings 42 under the table so that the uppermost portion of the wheel extends through opening 26 and slightly above a plane formed by the tops of the castors, preferably between about ⅛ and ¼ inch. The surfacing wheel is driven by means of motor 50 which drives gear 52 which in turn drives gear 54 mounted on shaft 41 which shaft transmits its rotary motion to the buffing wheel.

Although the wheel 40 is shown as mounted underneath the table with its surface projecting slightly through the opening 26 in the table, it is to be understood that it can be mounted in various other positions in conjunction with the table 10 having castors 20 thereon so as to permit surfacing of the heavy material while it is supported on the castors. For example, the surfacing wheel may be mounted to one side of the table or above the table and at various angles other than the vertical position shown in the drawing.

The surfacing wheel may be provided with numerous types of surfaces to achieve abrading, polishing, buffing, cutting, etc. A felt pad 58 is usually employed for removing scratches and this pad is frequently fed with water or a rouge or sand slurry to aid in buffing.

A further embodiment of the invention involves an automatic replenishing system for applying a surfacing solution to the buffing edge of the surfacing wheel, which system may be operated by the operator's foot. This enables the operator to handle and position the glass with respect to the surfacing wheel and at the same time use his foot to replenish the surfacing solution on the edge of the wheel without interrupting the surfacing operation to replenish the solution.

The replenishing mechanism is actuated by means of treadle 60 pivotally mounted on a leg of the table at 62. The treadle is connected by a rod 64 to bellcrank lever 66 which is pivoted at 67 on the table. The lever 66 in turn is connected by means of rod 68 to holder 70 which holds an applicator 72 such as a brush for applying the surfacing solution to the periphery of the wheel 40. The holder 70 is hinged to the table top at 76 and is held in a position away from the periphery of the wheel 40 by means of a spring 78 attached at one end to the table top and at the other end to the holder 70 at its end opposite to that which is hinged to the table.

One mode of replenishing the surfacing material on wheel 40 involves holding a ball of rouge against the periphery of the wheel for a minute or so about once every half hour. Water is then added periodically to the wheel by means of the replenishing mechanism to maintain a moist rouge surface for surfacing.

When the operator steps on treadle 60, the holder 70 and brush 72 are caused to swing down against the periphery of the wheel 40 and a perforated tube 80 also mounted on the holder 70 supplies water to the brush while it is in the down-position against the periphery of the wheel 40. The openings 81 in tube 80 are above the level of the water in the tube when the holder is in the up-position. As the holder and tube rotate, the openings rotate to a position below the level of the water and the water flows onto the applicator. This moistens the rouged wheel. When pressure on the treadle is released, the spring 78 causes the brush 72 and tube 80 to return to their normal up-position.

It can be seen from the description of the apparatus taken in conjunction with the drawing that a simple apparatus has been provided which enables a single operator to easily polish or surface a large, heavy article such as a sheet of plate glass. The handling of the glass is facilitated by means of the castors mounted on the table top and the surfacing wheel may be replenished with a suitable surfacing solution without interrupting the operation.

Although the present invention has been described with reference to specific details of certain embodiments thereof, it is not intended that such details shall be regarded as limitations upon the scope of the invention except insofar as included in the accompanying claims.

I claim:

1. An apparatus comprising in combination a working surface having inverted castors for supporting a sheet of material on its bottom surface, each castor comprising a bracket freely rotatable about a vertical axis, a horizontally extending axle carried by said bracket and a castor wheel freely rotatable about said axle, and a surfacing element intersecting said working surface and having a portion thereof extending slightly above said working surface to contact said sheet in a location other than a surface opposite the supported surface, said castors permitting free movement of the sheet of material in more than one direction relative to the surfacing element.

2. An apparatus for surfacing large, heavy articles, which comprises a working surface, inverted castors mounted on said surface, each castor comprising a bracket freely rotatable about a vertical axis, a horizontally extending axle carried by said bracket and a castor wheel freely rotatable about said axle, and a peripheral surfacing element intersecting said working surface and having a portion of its periphery slightly above said working surface to permit surfacing of a desired portion of the under surface of a heavy article while the latter is supported with said surface on the castors, said castors permitting free movement of the heavy article in more than one direction relative to the surfacing element.

3. An apparatus comprising in combination a working surface having inverted castors for supporting a sheet of material on its bottom surface, each castor comprising a bracket freely rotatable about a vertical axis, a horizontally extending axle carried by said bracket and a castor wheel freely rotatable about said axle, a surfacing element intersecting the working surface and having a portion thereof extending slightly above said working surface to contact said sheet in a location other than its surface opposite the supported surface, said castors permitting free movement of the sheet of material in more than one direction relative to the surfacing element, and means for applying a surfacing liquid to the surfacing element.

4. The apparatus according to claim 3, wherein said last named means comprises a treadle and a liquid applicator operable by depression of the treadle.

5. An apparatus comprising in combination a working surface having inverted castors disposed in a substantially horizontal plane for supporting a sheet of material thereon, each castor comprising a bracket freely rotatable about a vertical axis, a horizontally extending axle carried by said bracket and a castor wheel freely rotatable about said axle, and a surfacing element rotatable in a substantially vertical plane to intersect the plane of the castors so as to contact a localized portion of the sheet of material to be surfaced, said castors permitting free movement of the sheet of material in more than one direction relative to the surfacing element.

References Cited in the file of this patent

UNITED STATES PATENTS

| Number | Name | Date |
|---|---|---|
| 334,296 | Smith | Jan. 12, 1886 |
| 393,051 | Aiken | Nov. 20, 1888 |
| 1,037,852 | Beam | Sept. 10, 1912 |
| 1,113,216 | Holbrook | Oct. 13, 1914 |
| 1,273,996 | Borgeson | July 30, 1918 |
| 1,983,009 | Soderberg | Dec. 4, 1934 |
| 2,187,462 | Mulholland | Jan. 16, 1940 |
| 2,257,937 | Brunnhoelzl | Oct. 7, 1941 |
| 2,313,493 | Mols | Mar. 9, 1943 |
| 2,483,369 | Loucony | Sept. 27, 1949 |
| 2,486,850 | Ives | Nov. 1, 1949 |
| 2,563,018 | Fello | Aug. 7, 1951 |
| 2,632,197 | Moss et al. | Mar. 24, 1953 |
| 2,702,969 | Klaar | Mar. 1, 1955 |